Feb. 26, 1924.

T. TOLLACKSON

ANTISKID DEVICE

Filed June 1, 1921

1,485,239

Theodore Tollackson INVENTOR.

BY Geo. P. Kimmel ATTORNEY.

Patented Feb. 26, 1924.

1,485,239

UNITED STATES PATENT OFFICE.

THEODORE J. TOLLACKSON, OF WESTBY, WISCONSIN, ASSIGNOR OF ONE-HALF TO JOHN W. CHRISTENSEN, OF WESTBY, WISCONSIN.

ANTISKID DEVICE.

Application filed June 1, 1921. Serial No. 474,068.

*To all whom it may concern:*

Be it known that I, THEODORE J. TOLLACKSON, a citizen of the United States, residing at Westby, in the county of Vernon and State of Wisconsin, have invented certain new and useful Improvements in an Anti-skid Device, of which the following is a specification.

This invention relates to anti-skid devices for automobile tires and more particularly to transversely arranged anti-skid members therefor.

The object of the invention is to provide simple and efficient devices of this character which lie transversely across the tread of the tire when applied and are spaced peripherially from each other around the tire and are retained in position by any suitable means secured to the side members of the chain.

Another object is to provide a transverse member of this character which is strong and effective in operation and which will stand the severe wear and strain to which it is subjected and yet avoid all injury to the tire.

With these and other objects in view, the invention consists in certain novel features of construction as hereinafter shown and described and then specifically pointed out in the claim, and in the drawings illustrative of the preferred embodiment of the invention.

In the accompanying drawings:—

Figure 1:
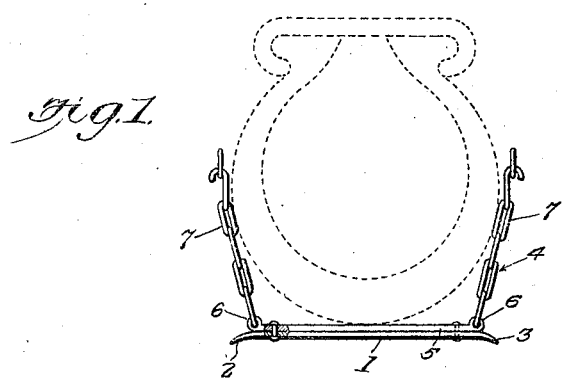
Fig. 1 represents a side elevation of one of the transverse members shown applied, the tire being in dotted lines.
Figure 2:
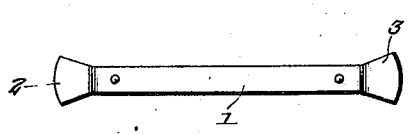
Fig. 2 is a bottom plan view of said member.

As illustrated in Figs. 1 and 2 the anti-skid element of each of the transverse members, consists of a substantially flat bar 1 having laterally extended ends 2 and 3 forming approximately flat biting members which are sharpened by bevelling and are bent slightly outwardly away from the tire as shown in Fig. 1. Each of these transverse members 1 is carried by a cross chain 4 which includes a flat bar 5 arranged to extend transversely across the tread of the tire and to which is riveted the anti-skid member 1. The bar 5 is provided at its opposite ends with eyes 6 to receive the inner adjacent links of the connecting chains 7 which are adapted to be detachably engaged with the side chains of the ordinary anti-skid chain, not shown.

The enlarged flattened biting heads 2 and 3 on each of the bars being bent outwardly at an angle as shown in Fig. 1 operate, when the car slides to either side, to engage the surface over which the car is passing and prevents skidding thereof.

These transverse members are very simple in construction and cheap and will effectively protect the car against skidding.

The preferred embodiment of the invention is disclosed in the drawings and set forth in the specifications, but it will be understood that any modifications within the scope of the claimed invention may be made in the construction without departing from the principle of the invention or sacrificing any of its advantages.

What is claimed is:—

An anti-skid device comprising an inner and outer bar arranged in superposed relation and secured together, said inner bar having each of its ends provided with an eye, means connected to said eyes for securing the bars in position with respect to the tread portion of a tire, and said outer bar having each end thereof formed to provide a flared and curved biting member extending and curving in a direction outwardly from an eye.

In testimony whereof, I affix my signature hereto.

THEODORE J. TOLLACKSON.